United States Patent [19]

Mihm et al.

[11] Patent Number: 5,306,043
[45] Date of Patent: Apr. 26, 1994

[54] DASHBOARD TOP MOUNTED VEHICLE AIR BAG ASSEMBLY

[75] Inventors: Joseph J. Mihm, North Branch; Patrick G. Jarboe, Shelby Township, Macomb County, both of Mich.

[73] Assignee: TRW Vehicle Safety Systems Inc., Lyndhurst, Ohio

[21] Appl. No.: 782,078

[22] Filed: Oct. 24, 1991

[51] Int. Cl.$^5$ ............................................. B60R 21/22
[52] U.S. Cl. ............................. 280/732; 280/743 A
[58] Field of Search ............... 280/743, 732, 730, 728, 280/743 A; 383/3

[56] References Cited

U.S. PATENT DOCUMENTS

| | | |
|---|---|---|
| 3,610,657 | 10/1971 | Cole . |
| 3,810,654 | 5/1974 | DeBano, Jr. et al. . |
| 3,831,972 | 8/1974 | Allgaier et al. ......................... 280/730 |
| 4,010,055 | 3/1977 | Oka et al. . |
| 4,169,613 | 10/1979 | Barnett . |
| 4,181,325 | 1/1980 | Barnett . |
| 4,265,468 | 5/1981 | Suszko et al. . |
| 4,290,627 | 9/1981 | Cumming et al. . |
| 4,911,471 | 3/1990 | Hirabayshi ........................... 280/732 |
| 4,944,529 | 7/1990 | Backhaus . |
| 5,022,675 | 6/1991 | Zelenak, Jr. et al. ................. 280/743 |

Primary Examiner—Karin L. Tyson
Attorney, Agent, or Firm—Calfee, Halter & Griswold

[57] ABSTRACT

A inflatable vehicle air bag has a single fluid chamber and is specially designed to bend around a vehicle instrument panel to form an effective occupant restraint in front of a vehicle occupant. The air bag is formed from a single continuous loop of flexible air bag material. The air bag is designed to be inflated to a predetermined three dimensional configuration when fluid under pressure is directed into the fluid chamber. The air bag comprises a pair of main panels which are connected with each other in a manner which allows them to bow outwardly relative to each other as the air bag is inflated to its predetermined three dimensional configuration, and a special bend pleat which is formed in one of the main panels. Moreover, respective portions of the main panels are preferably connected with each other by one or more expansible end pleats which allow the portions of the main panels to separate from each other as the air bag is inflated to its three dimensional configuration. The bend pleat enables the air bag to bend around a vehicle instrument panel as the air bag is being inflated to its predetermined three dimensional configuration. The air bag is particularly useful for a top mounted air bag assembly in which the air bag (i) is deployed through the top of a vehicle instrument panel and (ii) bends about the instrument panel and forms an inflated cushion between a vehicle occupant and the front of the instrument panel.

22 Claims, 4 Drawing Sheets

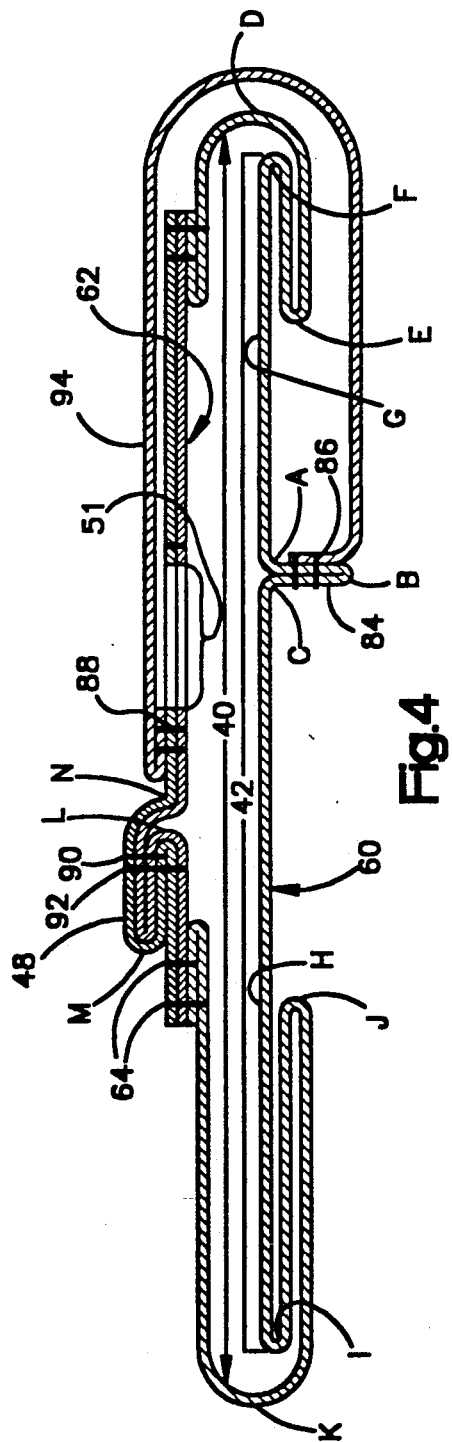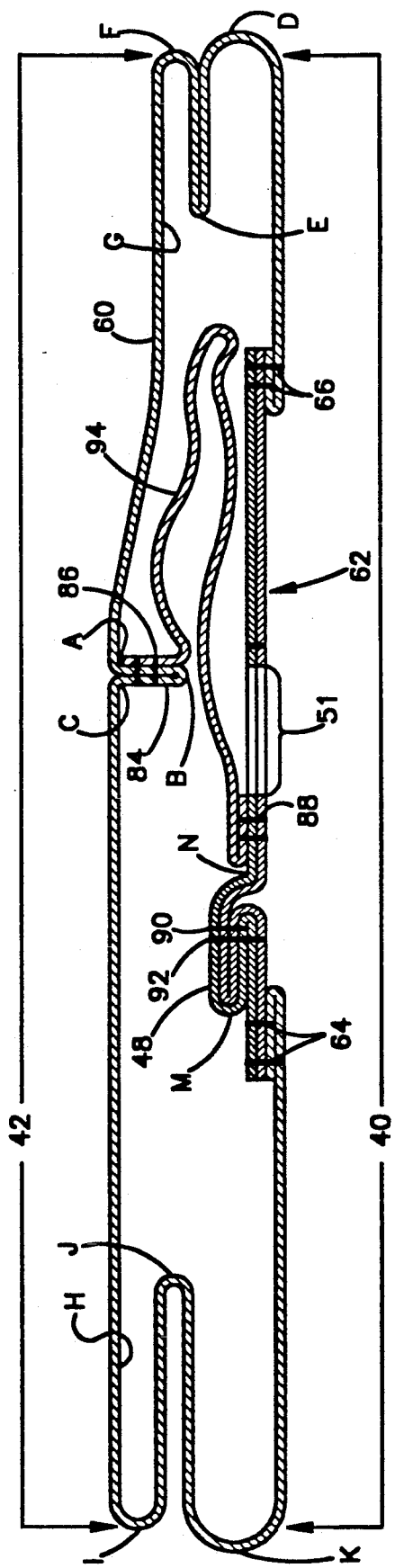

DASHBOARD TOP MOUNTED VEHICLE AIR BAG ASSEMBLY

TECHNICAL FIELD

The present invention relates to a vehicle air bag which is simple in construction, efficient to manufacture, and configured to bend around a structural part of an occupant compartment (e.g., an instrument panel) as the air bag is being deployed. Moreover, the air bag of the present invention is particularly useful in an air bag assembly which is mounted in the top of a vehicle instrument panel, and in which the air bag bends around the corner of the instrument panel as the air bag is being deployed.

BACKGROUND OF THE INVENTION

An air bag assembly is designed to be incorporated into a vehicle to protect an occupant during a crash or collision. During a front end collision, a vehicle will be subjected to significant deceleration forces. If the deceleration forces are great enough, they will cause an unrestrained occupant to be pitched forward. An air bag assembly causes an air bag to be rapidly inflated in front of a vehicle occupant who is being pitched forward during a vehicle collision. The inflated bag prevents the occupant from striking a structural part of the vehicle interior (e.g., the vehicle instrument panel and/or windshield).

Typically, an air bag assembly includes: (i) a container; (ii) a folded air bag disposed in the container; and (iii) a fluid source disposed at least partially within the container. At the onset of a collision, the fluid source is actuated to discharge a flow of relatively high pressure fluid. The fluid flow rapidly (i) forces the air bag through a portion of the container and into the occupant compartment, and (ii) inflates the air bag to a predetermined configuration in front of an occupant who is being pitched forward by the force of the collision. The air bag retards forward movement of the occupant, to prevent the occupant from striking a structural part of the vehicle interior.

On the driver side of a vehicle, an air bag assembly is commonly incorporated into the steering wheel. On the passenger side of a vehicle, an air bag assembly is commonly incorporated into (or located in proximity to) the vehicle instrument panel. Moreover, on the passenger side of a particular make of vehicle, the specific manner which the air bag assembly is incorporated into the vehicle instrument panel has an effect on the design and function of an air bag for that make of vehicle. For example, in an air bag assembly located underneath the vehicle instrument panel, the air bag would have to be oriented to clear the legs of a seated occupant and would have to inflate upward in front of the vehicle instrument panel. On the other hand, in an air bag assembly incorporated into the portion of the vehicle instrument panel which is presented toward the vehicle occupant, the air bag would be positioned to deploy through the instrument panel toward the occupant. The bag would inflate to a generally cylindrical (or pillow) shape directly in front of a vehicle occupant. Still further, in an air bag assembly in which the air bag is deployed through the top of the instrument panel (referred to herein as a "top mounted" air bag assembly), the air bag is initially directed upward, toward the windshield of the vehicle. The air bag must then be quickly and effectively redirected so as to form a cushion between a vehicle occupant and the portion of the vehicle instrument panel presented toward the occupant.

A known way of deploying an air bag from a top mounted air bag assembly or from underneath a vehicle instrument panel is to:
 (i) fabricate the air bag with multiple fluid chambers disposed in fluid communication with each other;
 (ii) inflate the chambers successively, such that as one chamber is substantially filled with fluid, the fluid is communicated from the one chamber to a successive chamber; and
 (iii) orient the chambers relative to each other such that at least one of the chambers, when inflated, is located in front of the instrument panel.

U.S. Pat. Nos. 4,169,163 and 4,290,627 illustrate air bag assemblies using multiple chamber air bags. In each of the foregoing patents, a multiple chamber air bag has a chamber oriented in front of a vehicle instrument panel when the air bag is fully inflated.

Applicants believe that multiple chamber air bags, while useful, are somewhat complicated in their design and fabrication For example, applicants believe that in designing a multiple chamber air bag, one must:
 (i) provide enough air bag material to form the multiple chambers;
 (ii) physically connect the chambers so that when the chambers are inflated at least one chamber will be oriented in front of the vehicle instrument panel; and
 (iii) provide fluid connections between the chambers which eliminate, minimize or account for turbulence as fluid is directed from one chamber to another.

Accordingly, applicants believe it is desirable to construct an air bag which has a single fluid chamber, which is simple and efficient to form, and which is specially designed to bend about a vehicle instrument panel to a position in front of a vehicle occupant. Applicants believe such an air bag can be designed with relative economy of material and without the kind of fluid turbulence which can occur when fluid is directed from one chamber to another. Applicants further believe that such an air bag can still have the ability to bend about a vehicle instrument panel to allow the air bag to be incorporated into a "top mounted" air bag assembly.

Applicants note that certain air bag constructions are allegedly designed for their relative economy of material (see e.g., U.S. Pat. No. 4,944,529). However, such constructions are believed to be capable, at most, of being deployed directly at a vehicle occupant and are not capable of bending in a predetermined manner about a vehicle instrument panel.

SUMMARY OF THE PRESENT INVENTION

The present invention relates to a vehicle air bag which is simple in construction, has a single fluid chamber, and is specially designed to bend around a vehicle instrument panel to form an effective occupant restraint in front of a vehicle occupant. Thus, an air bag according to the present invention is believed to be particularly useful for a top mounted air bag assembly. Still further, an air bag of the present invention can be made from a single continuous loop of flexible air bag fabric using a simple and efficient technique which is believed to minimize waste of material.

According to the invention, the air bag is formed of flexible material and defines a single, internal fluid cavity. The air bag comprises a pair of main panels which are connected with each other in a manner which enables them to bow outwardly from each other as the air bag is inflated. At least one expansible end pleat interconnects certain end portions of the main panels and enables the end portions of the main panels to separate from each other as the air bag is inflated. Preferably, a pair of expansible end pleats interconnect respective end portions of both main panels, and allow those end portions of both main panels to separate from each other as the air bag is inflated. A special bend pleat is formed in and disposed at a predetermined location on one of the main panels. The bend pleat is configured to cause the one main panel to bend at the predetermined location as the air bag is being inflated. The bend pleat, in combination with the remainder of the bag construction, causes a reshaping of the bag so that it bends about a vehicle instrument panel and has a predetermined configuration in front of the vehicle instrument panel. In some instances, an internal tether may be useful in controlling the external shape of the bag as it bends around a vehicle instrument panel.

According to an additional aspect of the present invention, the air bag is formed essentially from a continuous tube of flexible material. Preferably, the continuous tube of flexible material is formed from one or more rectangular segments which are joined together to form the continuous tube. The continuous tube of flexible material has continuous edges which are opposite to each other and spaced apart by the width of the rectangular segment (s) which form the tube. The continuous tube is formed into a pair of main panels and a pair of expansible end pleats which extend between the main panels to define an expansible air bag with a single, internal fluid cavity. The bend pleat is formed in one of the main panels, at a location which causes the air bag to bend about a vehicle instrument panel when the bag is being deployed.

The air bag of the present invention is incorporated into a top mounted air bag assembly. Specifically, the air bag is disposed in a container and is designed to be deployed into the occupant compartment of a vehicle through an opening in the top of the vehicle instrument panel. The bend pleat enables the air bag to bend around the vehicle instrument panel and form a cushion in front of an occupant being pitched forward by the force of a vehicle collision. Moreover, according to the preferred embodiment, the air bag includes a pair of expansible end pleats, with one expansible end pleat being larger than the other expansible end pleat. As a result, the end portions of the main panel which are interconnected by the larger expansible end pleat will separate from each other by a greater amount than the end portions of the main panel which are interconnected by the small expansible end pleat. The larger expansible end pleat is located in front of the vehicle instrument panel when the air bag is inflated, so that the part of the air bag which forms a cushion in front of the vehicle occupant has a sufficient depth to restrain the vehicle occupant properly. Also, the bend pleat specifically shapes the outer periphery of certain areas of the air bag in the vicinity of the bend pleat in a manner which further enhances the performance of that part of the air bag.

Further features of the present invention will become further apparent from the following detailed description and the accompanying drawings.

BRIEF DESCRIPTION OF THE DRAWINGS

FIG. 4 is a schematic sectional illustration of a air bag according to the present invention, taken from the direction 4—4 in FIG. 3, during an initial stage of its formation; and FIG. 5 is a schematic sectional illustration of the air bag according to the invention, after the final stage of its formation.

DETAILED DESCRIPTION

Figure 1:
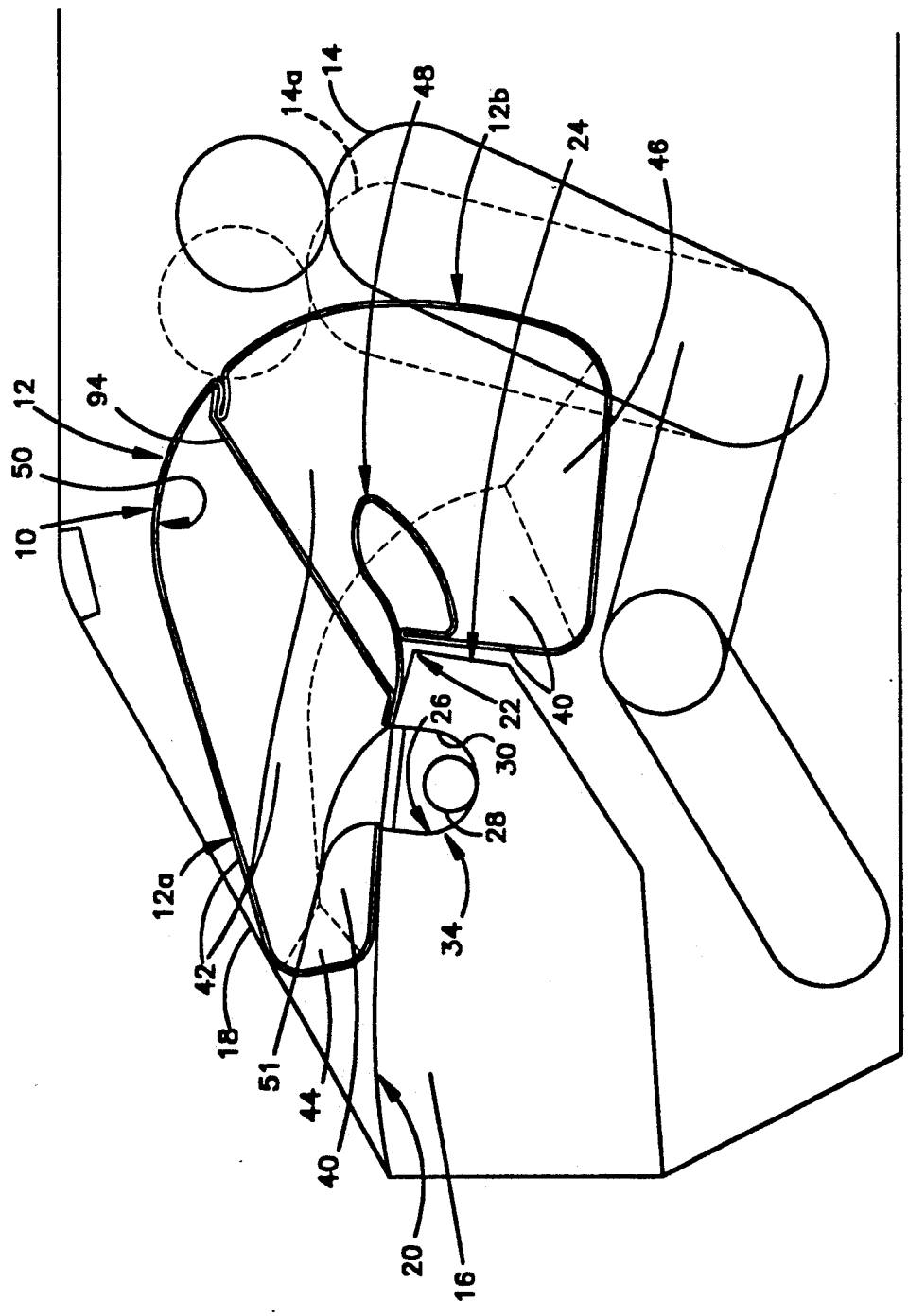
FIG. 1 is a schematic illustration of a top mounted vehicle air bag assembly with an air bag constructed according to the present invention deployed in front of a vehicle occupant.

FIG. 1 illustrates an air bag assembly 10, constructed according to the principles of the present invention, with an air bag 12 deployed and inflated to a predetermined configuration in front of a vehicle occupant 14. The air bag assembly 10 is installed in a vehicle in a manner so as to protect the occupant 14 during a crash or collision. During a front end collision, the vehicle will be subjected to significant deceleration forces which, if great enough, will cause the occupant 14 to be pitched forward (in the manner illustrated in the dashed lines 14A). On the passenger side of a vehicle, the occupant 14 would be pitched forward toward a structural component such as the vehicle instrument panel 16 and/or the windshield 18. The air bag 12 acts as a cushion to absorb energy and retard forward movement of the occupant 14 to prevent the occupant 14 from striking the instrument panel 16 or the windshield 18.

The air bag assembly 10 is referred to as a "top mounted" air bag assembly. Specifically, the assembly 10 is incorporated into the vehicle instrument panel 16 in such a manner that the air bag 12 is "deployed" (i.e., projected into the vehicle compartment) through the portion 20 of the vehicle instrument panel 16 which is presented toward the windshield 18. (Portion 20 of the instrument panel 16 is hereinafter referred to as the "top" of the instrument panel.) As it is deployed, the air bag 12 is inflated and bent around the instrument panel 16 so as to form an inflated cushion between the occupant 14 and the portion 24 of the instrument panel 16 presented toward the occupant. (Portion 24 of the instrument panel 16 is hereinafter referred to as the "front" of the instrument panel.) As illustrated, the top 20 and front 24 of the instrument panel define a corner 22 at their juncture. Such a sharply defined corner, however, is not essential to the invention.

The basic components of the air bag assembly 10 comprise a container 26, the air bag 12, and a fluid source such as an inflator 28. Prior to deployment, the air bag 12 is folded into a compact form and disposed within the container 26. The air bag 12 is preferably made of flexible, woven fabric (e.g., nylon or polyester) but could be made of other flexible materials, such as plastic film. The container 26 preferably comprises a reaction can 30 that forms a receptacle for the air bag 12 and a cover (not shown) that closes the reaction can.

The cover may also form part of the top 20 of the instrument panel 16. Nonetheless, other container constructions are possible with, and contemplated by, the present invention. For example, the container 26 could comprise a relatively flat reaction plate and a cover that forms the substantial part of a receptacle for the air bag.

The inflator 28 is preferably cylindrical in shape and is disposed within the container 26. The inflator 28 includes fluid discharge ports such as radially oriented nozzles (not shown) which point towards the air bag 12. While the inflator 28 is shown completely disposed within the reaction can 30, any arrangement in which the inflator 28 is at least partially disposed within the reaction can 30 is within the scope of the present invention.

The air bag assembly 10 is designed for use on the passenger side of a vehicle and is coupled to the instrument panel 16 of the vehicle, via the container 26. The top 20 of the instrument panel 16 extends at an acute angle to the windshield 18. The front 24 of the instrument panel 16 meets the top 20, forming the corner 22, and extends downward from the top. In the embodiment illustrated in FIG. 1, the container 26 is mounted in a cavity 34 formed below the top 20 of the instrument panel 16.

At the onset of a collision, a chemical mixture (not specifically shown) in the inflator 28 is ignited to generate a flow of relatively high pressure fluid (e.g., an inert, non-toxic gas, such as nitrogen). The fluid is directed into the air bag 12 and rapidly forces the air bag 12 through a portion of the cover and out of the cavity 34 in the instrument panel 16. The cover can have any of a number of well known constructions to enable the air bag 12 to be forced through the cover.

As the air bag 12 is forced out of the top 20 of the instrument panel 16, the air bag 12 is rapidly inflated to its predetermined shape by continued flow of high pressure fluid from the inflator 28. Specifically, the air bag 12 is inflated to a shape that includes an upper portion 12A and a front portion 12B. The upper portion 12A of the air bag 12 extends along the top 20 of the instrument panel 16. The front portion 12B is bent around the corner 22 of the instrument panel 16 and is disposed between the front 24 of the vehicle instrument panel 16 and the vehicle occupant 14. The construction of the air bag 12, described more fully hereinafter, enables the air bag to assume the foregoing configuration.

The air bag 12 basically comprises a pair of main panels 40, 42, a pair of expansible end pleats 44, 46 extending between and interconnecting end portions of the main panels, and a special bend pleat 48. The main panels 40, 42, the expansible end pleats 44, 46, and the bend pleat 48 cooperate to define a single internal fluid cavity 50 within the air bag 12. Further, the main panels 40, 42, the expansible end pleats 44, 46 and the bend pleat 48 cooperate to shape the air bag 12 as the air bag 12 is being inflated. Specifically, end portions of the main panels 40, 42 are interconnected with each other by the expansible end pleats 44, 46 and the edges of the main panels 40, 42 are connected directly to each other. As a result of such connections, as the air bag 12 is being inflated, (a) the main panels bow outwardly from each other, and (b) the end portions of the main panels separate from each other. The bend pleat 48 is disposed in the main panel 40. As the air bag is being inflated, the bend pleat 48 enables the main panel 40 to bend about the corner 22 of the instrument panel 16. As the main panel 40 bends around the corner 22 of the instrument panel 16, the front portion 12B of the air bag assumes a position in front of the front 24 of the instrument panel 16 (FIG. 1). The front portion 12B then forms a cushion in front of the vehicle occupant 14 and retards forward movement of the vehicle occupant, in the manner described above.

Figure 2:
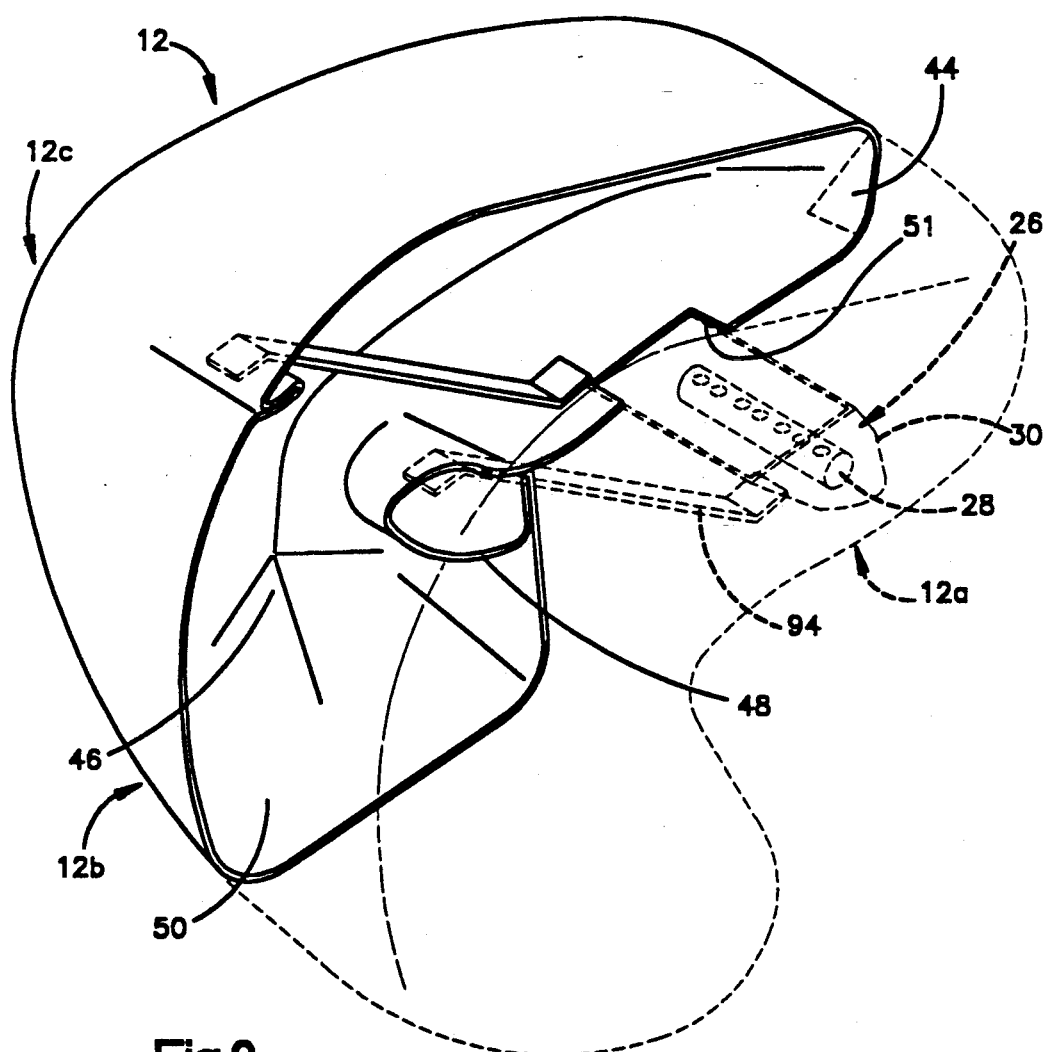
FIG. 2 is a schematic, three-dimensional illustration, with portions broken away, of an air bag according to the present invention in an inflated configuration.

As seen from FIGS. 1 and 2, the expansible end pleat 44 is located near the windshield 18 of the vehicle. The expansible end pleat 46 is located toward the lower end of the front portion 12B of the air bag. The expansible end pleat 46 is preferably larger than the expansible end pleat 44, to give the air bag 12 greater depth in the front portion 12B than in the top portion 12A when the air bag 12 is inflated, as described more fully hereinafter. Moreover, it may be possible to interconnect the ends of the main panels in a way that eliminates the expansible end pleat 44 and still results in an air bag with an acceptable three dimensional configuration.

As seen in FIG. 1, the air bag 12 has a fluid inlet opening 51 (or mouth) through which the fluid under pressure is directed into the fluid cavity 50 in the air bag 12. The bend pleat 48 is disposed in the main panel 40 between the fluid inlet opening 51 of the air bag 12 and the expansible end pleat 46. As described above, the bend pleat 48 is specially designed to cause the air bag 12 to bend around the corner 22 of the instrument panel 16. The bend pleat 48 is also specially designed to cause the front portion 12B of the air bag to have a rounded profile in the area 12C (FIG. 2) when it meets the top portion 12A of the air bag, as described more fully hereinafter.

Figure 3:
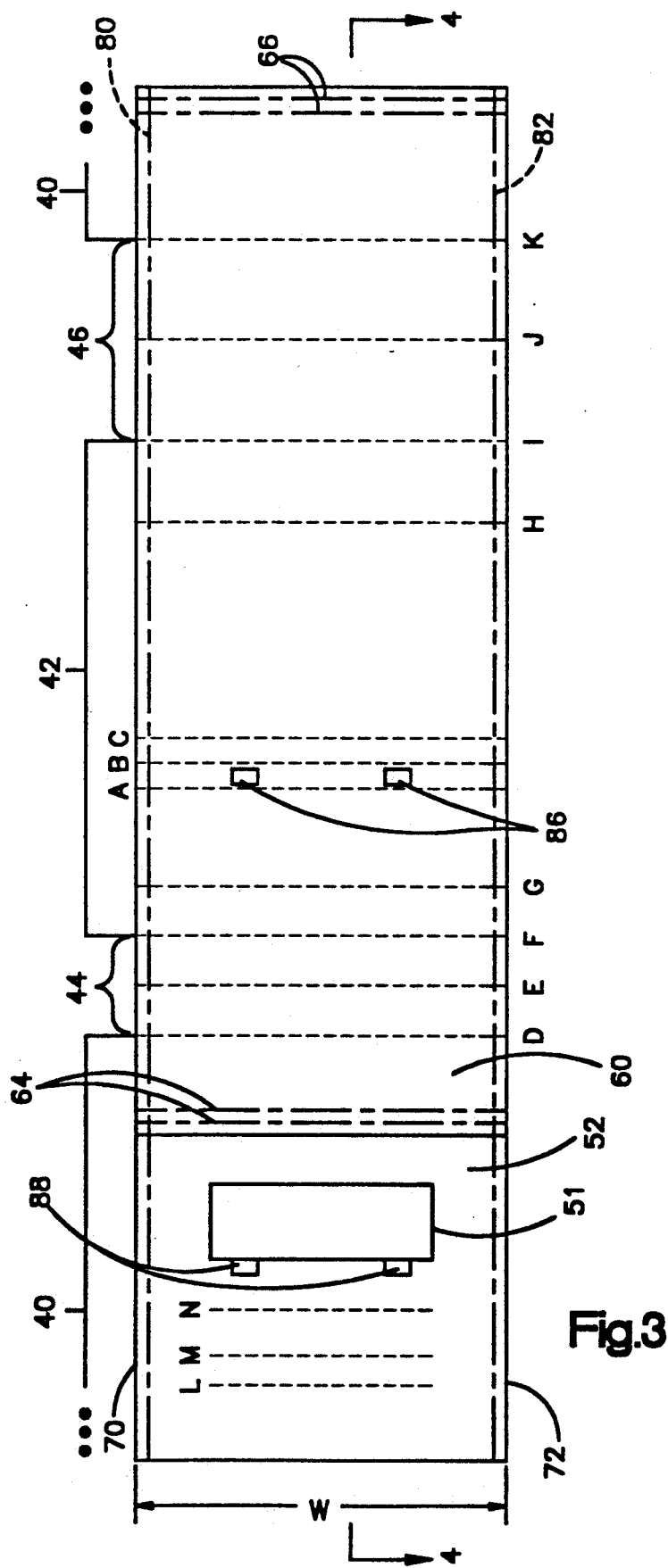
FIG. 3 is a schematic layout plan view of fabric segments used to form an air bag according to the present invention, and schematically illustrating the locations for the fold, pleat and seam patterns which are used to form the air bag.

An air bag according to the principles of this invention is preferably manufactured from a pair of rectangular fabric segments. Referring to FIGS. 3 and 4, a long fabric segment 60 preferably comprises a single layer of fabric, in a rectangular configuration. A shorter fabric segment 62 is formed as a double layer of fabric, also in a rectangular configuration. A first end of the shorter fabric segment 62 is sewn to one end of the longer fabric segment 60 along a first seam 64. The other end of the shorter fabric segment 62 is sewn to the other end of the longer fabric segment 60 along a second seam 66, thereby to form the fabric into a continuous loop or tube of flexible fabric material. The seams 64, 66 are each preferably formed by means of double needle stitches. The continuous fabric tube has continuous, parallel edges 70, 72 which are spaced by a distance "W" (FIG. 3) which is referred to herein as the width of the fabric tube.

The mouth (or fluid inlet opening) 51 of the air bag is preferably formed in the shorter fabric segment 62. Moreover, a relatively rigid frame (not shown) can be incorporated into the mouth 51 of the air bag. Fabric material at the mouth of the air bag material is looped over the frame and then sewn back onto itself to capture the frame in a loop of fabric about the mouth of the air bag. Such a technique would be readily apparent to those of ordinary skill in the air bag art.

Thereafter, the continuous tube of fabric is formed into the air bag 12. Before describing the air bag forming process, it should be noted that the air bag is initially formed in an "inside out" condition, to the profile shown in FIG. 4. The air bag is then inverted (i.e., pulled through the mouth 51) to its final form shown in FIG. 5. Also, in FIG. 3, a pair of parallel phantom lines 80, 82 depict lines at which certain seams are sewn along the edges of the fabric tube, as defined further below. Further, certain transverse reference lines (shown as dashed lines A-N in FIG. 3 and points A-N in FIGS. 4 and 5) are used to illustrate how the air bag is formed. Additionally, it is contemplated that V-shaped notches (not shown) may be formed in the edges of the fabric segments 60, 62 to enable the fabric segments (and the fabric tube formed from the segments) to be accurately oriented, and the reference lines A-N readily identified, during formation of the air bag.

After the continuous fabric tube is formed, it is used to form the air bag in the "inside out" configuration of FIG. 4. Specifically, a tether pleat 84 is formed in the fabric tube, preferably in the longer fabric segment 60. The tether pleat 84 is formed by drawing the main fabric segment 60 into a double layer of fabric extending across the width W of the fabric tube, at the location and in the manner illustrated by the reference lines and points A, B, C in FIGS. 3 and 4.

Next, the expansible end pleats 44, 46, are formed by flattening the fabric tube and folding back the closed ends of the fabric tube on top of the fabric tube (across the entire width of the fabric tube) to create additional folded layers of fabric at the ends of the fabric tube. When the additional folded layers are formed in the fabric tubes, the edges 70, 72 of the fabric tube are maintained in overlapped relation and in registry with each other. In FIGS. 3 and 4, the additional folded layers are formed in the manner illustrated by the reference lines and points D, E, F, G and the reference lines and points H, I, J, K. As seen from FIGS. 3 and 4, the additional folded layer formed in the manner illustrated by the reference lines H, I, J, K is larger than the additional folded layer formed in the manner illustrated by the reference lines D, E, F, G, to produce expansible end pleats of different sizes in the final air bag.

Further, it should be noted that the single additional folded layers formed at the closed ends of the fabric tube (and shown in FIGS. 3 and 4) will produce expansible end pleats 44, 46 as single pleats in the final air bag. That is the simplest form of expansible end pleats contemplated by the present invention. However, it is possible to include more expansible end pleats by forming plural additional folded layers at each of the ends of the fabric tube.

Next, all overlapped edges of the fabric tube (including the overlapped edges of the additional folded layers) are sewn together along parallel seams depicted by the phantom lines 80, 82 in FIG. 3. The parallel seams,.
  (i) fix the fabric tube and the additional folded layers in the orientation shown in FIG. 4; and,
  (ii) except for the fluid inlet 51, form the fabric tube into a closed bag with:
    (a) the end portions of the main panels 40, 42 fixed to the additional folded layers at the ends of the fabric tubes,
    (b) the remaining overlapped edges of the main panels 40, 42 being aligned with each other and joined directly to each other by the seams depicted by the phantom lines 80, 82; and
    (c) a single, closed fluid chamber bordered by the main panels 40, 42 and the additional folded layers at the ends of the fabric tube.

The portions of the fabric segments 60, 62 and the fabric tube which form the main panels 40, 42 are schematically illustrated in FIGS. 3 and 4.

Then the bend pleat 48 is formed in the main panel 40. The bend pleat 48 is formed by pinching the main panel 40 into a double loop of fabric. The double loop of fabric is located inward of the edges 70, 72 of the fabric tube and is oriented transverse to the edges 70, 72 of the fabric tube as depicted by the reference lines and points L, M, N in FIGS. 3 and 4. Since the main panel 40 is formed in the fabric segment having a double thickness, reference to a "double loop" of fabric actually means the bend pleat 48 has a thickness of four layers of fabric. The bend pleat 48 is fixed by means of a first seam 90 and an additional seam 92. The first seam 90 is formed by a double needle stitch and closes the bend pleat. The additional seam 92 is formed by a double needle top stitch and extends through the bend pleat and the main panel 40 adjacent the bend pleat 48.

Also, it should be noted that as the bend pleat 48 is formed, the portions of the fabric tubes between the bend pleat and the edges 70, 72 of the fabric tube are drawn inward (i.e., toward the bend pleat 48). That construction causes the outer periphery of the air bag in the vicinity of the bend pleat (i.e., the area of the air bag identified at 12C in FIG. 2) to assume a curved profile, as described above.

A tether 94 is attached to the fabric tube in the manner illustrated in FIG. 4. Specifically, one end of the tether 94 is sewn to one of a pair of tether attachment points 86 on the tether pleat 84. The other end of the tether 94 is sewn to one of a pair of tether attachment points 88 adjacent the mouth 51 of the air bag between the mouth and the bend pleat 48.

Finally, the air bag 12 is inverted by pulling the entire bag through its mouth 51. Inverting the air bag 12 in this manner causes the additional folded layers at the ends of the fabric tubes to form the expansible end pleats 44, 46, as illustrated in FIG. 5. The single fluid cavity 50 is defined between the main panels 40, 42 and the expansible end pleats 44, 46. The tether 94 is disposed internal to the fluid cavity 50. The bend pleat 48 extends to the inside of the outer periphery of the air bag and along a border of the fluid cavity 50. Also, the bend pleat 48 is located in the main panel 40 between the mouth 51 of the air bag and the larger expansible end pleat 46.

Thus,, it should be clear that the air bag will have a single fluid cavity 50 with both a tether 94 and a bend pleat 48 extending inward from the perimeter of the air bag with the bend pleat located proximate to the mouth 51 of the air bag.

With such a configuration, the air bag 12 will have a single fluid cavity 50, but will readily inflate to the configuration described above (and shown in FIGS. 1 and 2). In that inflated configuration, the bend pleat 48 will cause the front portion 12B (with the larger expansible end pleat 46) to cover the front 24 of the vehicle instrument panel. Moreover, since the bend pleat 48 does not extend fully across the width W of the fabric tube, the formation of the bend pleat also results in edges of the fabric tube in the vicinity of the bend pleat being drawn inward, i.e. toward the bend pleat. With that configuration, the air bag 12 not only bends about the corner 22 of the instrument panel, but its area 12C is shaped into a slightly rounded configuration. This is believed to provide even a more effective cushion for a vehicle occupant.

Accordingly, the present invention relates to an air bag specially designed to bend around a vehicle instrument panel and to cushion a vehicle occupant effectively, while forming the air bag exclusively from a single tube of fabric. The foregoing techniques are believed to economize the use of the fabric in the sense that little fabric needs to be wasted. They are also believed to form a very efficient and simple way of forming such an air bag.

With the foregoing disclosure in mind, it is believed that various obvious modifications of the applicant's concept will become apparent to those of ordinary skill in the art.

We claim:

1. An inflatable vehicle air bag comprising:

a bag formed of flexible material and having an internal fluid cavity;

said bag being inflatable to a predetermined three dimensional configuration when fluid under pressure is directed into said fluid cavity;

said bag comprising a pair of main panels having an interconnection with each other which enables the main panels to bow outward relative to each other as the bag is inflated, the interconnection including at least one expansible end pleat which interconnects respective portions of the main panels and enables the portions of the main panels to separate from each other as the bag is inflated;

said bag having a fluid opening to enable fluid under pressure to be directed into said fluid cavity; and said bag further comprising means for causing one of said main panels to bend at a predetermined location, said means consisting essentially of a bend pleat formed in said one of said main panels;

said bend pleat comprising a folded loop of said one of said main panels, said folded loop including at least two layers of flexible material, said two layers of flexible material being fastened to each other;

the capability of said main panels to bow outward relative to each other and the bending of said one main panel caused by said bend pleat at least partially contributing to said predetermined three dimensional configuration of said bag as said bag is inflated to said predetermined configuration.

2. An inflatable vehicle air bag as set forth in claim 1, wherein said fluid cavity comprises a single fluid chamber which is bordered by said main panels and the interconnection therebetween.

3. An inflatable vehicle air bag comprising:

a bag formed of flexible material and having an internal fluid cavity;

said bag being inflatable to a predetermined three dimensional configuration when fluid under pressure is directed into said fluid cavity;

said bag comprising a pair of main panels having an interconnection with each other which enables the main panels to bow outward relative to each other as the bag is inflated, the interconnection including at least one expansible end pleat which interconnects respective portions of the main panels and enables the portions of the main panels to separate from each other as the bag is inflated;

said bag having a fluid opening to enable fluid under pressure to be directed into said fluid cavity; and said bag further comprising means for causing one of said main panels to bend at a predetermined location, said means consisting essentially of a bend pleat formed in said one of said main panels;

the capability of said main panels to bow outward relative to each other and the bending of said one main panel caused by said bend pleat at least partially contributing to said predetermined three dimensional configuration of said bag as said bag is inflated to said predetermined configuration;

wherein said bag has an outer periphery defined substantially by said main panels and the interconnection therebetween, and wherein said bend pleat comprises a folded segment of said one main panel which extends inward of the outer periphery of said air bag;

said folded segment of said one main panel being spaced from the other main panel and forming part of the border of said fluid chamber.

4. An inflatable vehicle air bag as set forth in claim 1, wherein the interconnection between said main panels comprises a pair of expansible end pleats, each of which interconnects respective end portions of said pair of main panels, one of said expansible end pleats being larger than the other of said expansible end pleats.

5. An inflatable vehicle air bag as set forth in claim 4, wherein said fluid opening is formed in said one of said main panels, said bend pleat being located between said fluid opening and said one of said expansible end pleats.

6. An inflatable vehicle air bag comprising:

a bag formed of flexible material and having an internal fluid cavity;

said bag being inflatable to a predetermined three dimensional configuration when fluid under pressure is directed into said fluid cavity;

said bag comprising a pair of main panels having an interconnection with each other which enables the main panels to bow outward relative to each other as the bag is inflated, the interconnection including at least one expansible end pleat which interconnects respective portions of the main panels and enables the portions of the main panels to separate from each other as the bag is inflated;

said bag having a fluid opening to enable fluid under pressure to be directed into said fluid cavity; and one of said main panels including means for causing said one main panel to bend at a predetermined location, said means consisting essentially of a bend pleat which is formed in and disposed at said predetermined location on main panel and which is configured to alone cause said one main panel to bend at said predetermined location;

the capability of said main panels to bow outward relative to each other and the bending of said one main panel caused by said bend pleat at least partially contributing to said predetermined three dimensional configuration of said bag as said bag is inflated to said predetermined configuration;

wherein said air bag comprises a continuous tube of flexible material shaped into said main panels, the interconnection, and said bend pleat;

said continuous tube of flexible material having opposed edges spaced apart by a predetermined width; and said bend pleat extending transverse to said opposed edges and having an extent which is less than said predetermined width, thereby to produce a curvature in the outer periphery of said air bag in the vicinity of said bend pleat when said air bag is inflated to said predetermined three dimensional configuration;

said bend pleat comprising a folded loop of said one of said main panels, said folded loop including at least two layers of flexible material, said two layers of flexible material being fastened to each other.

7. An inflatable vehicle air bag as set forth in claim 1, further comprising at least one tether disposed within said internal cavity, said at least one tether having opposite ends connected to respective portions of each of said main panels.

8. An inflatable vehicle air bag comprising:
a bag formed of flexible material and having an internal fluid cavity;
said bag being inflatable to a predetermined three dimensional configuration when fluid under pressure is directed into said fluid cavity;
said bag comprising a pair of main panels having an interconnection with each other which enables the main panels to bow outward relative to each other as the bag is inflated, the interconnection including at least one expansible end pleat which interconnects respective portions of the main panels and enables the portions of the main panels to separate from each other as the bag is inflated;
said bag having a fluid opening to enable fluid under pressure to be directed into said fluid cavity; and
one of said main panels comprising means for causing said one main panel to bend at a predetermined location, said means consisting essentially of a bend pleat formed in and disposed at said predetermined location on said main panel and configured to cause said one main panel to bend at said predetermined location;
the capability of said main panels to bow outward relative to each other and the bending of said one main panel caused by said bend pleat at least partially contributing to said predetermined three dimensional configuration of said bag as said bag is inflated to said predetermined configuration;
wherein said bag has an outer periphery defined substantially by said main panels and the interconnection therebetween, and wherein said bend pleat comprises a folded loop of one main panel which extends inward of the outer periphery of said air bag;
said folded loop of said one main panel being spaced from the other main panel and forming part of the border of said fluid chamber;
said folded loop including at least two layers of flexible material, said two layers of flexible material being fastened to each other and forming an open loop.

9. An inflatable air bag as set forth in claim 8, wherein the interconnection between said main panels comprises a pair of expansible end pleats, each of which interconnects respective end portions of said pair of main panels, one of said expansible end pleats being larger than the other of said expansible end pleats.

10. An inflatable air bag as set forth in claim 9, wherein said fluid opening is formed in said one of said main panels, said bend pleat being located between said mouth and said one of said expansible end pleats.

11. An inflatable vehicle air bag as set forth in claim 10, further comprising at least one tether disposed within said internal cavity, said at least one tether having opposite ends connected to respective portions of each of said main panels.

12. A method of forming a vehicle air bag, comprising the steps of:
forming flexible material into a continuous tube with a fluid opening therein,
forming the continuous tube of flexible material into an expansible bag with a pair of main panels, an interconnection between said main panels which includes at least one expansible end pleat extending between respective portions of said main panels, and an internal fluid cavity bordered by said main panels and the interconnection therebetween, and
forming a bend pleat at a predetermined location in one of said main panels;
the interconnection between said main panels enabling said main panels to bow outward relative to each other and enabling said respective portions of said main panels to separate from each other as fluid is introduced into said fluid cavity, and said bend pleat located to cause said one main panel to bend at said predetermined location as the pair of main panels bow outward relative to each other;
wherein said step of forming the continuous tube into an expansible bag comprises:
flattening the continuous tube into a double layer of flexible material having opposed ends and overlapped aligned edges extending between said opposed ends, said fluid inlet opening being disposed in one of said layers of flexible material and located between said opposed ends,
folding at least one end of the double layer of flexible material into said at least one expansible end pleat while maintaining overlapped edges of the continuous tube of flexible material aligned with each other;
fastening all of the overlapped edges of the continuous loop of flexible material to each other; and
forming said bend pleat by pinching a portion of one of the main panels into a folded back loop of flexible material spaced inward from said overlapped edges and extending transverse to said overlapped edges of said continuous tube of flexible material and fastening the layers of said folded back loop of flexible material to each other.

13. A method as set forth in claim 12, including the step of folding both ends of the double layer of flexible material into a pair of expansible end pleats while maintaining overlapped edges of said continuous tube of flexible material aligned with each other, one of said expansible end pleats being larger than the other of said expansible end pleats, and the portions of the double layer of flexible material extending between the expansible end pleats comprising the main panels.

14. A method as set forth in claim 13, including the step of forming said fluid opening in the said one of said main panels and said step of forming said bend pleat comprises the step of forming said bend pleat in said one of said main panels between said fluid opening and the larger of said expansible end pleats.

15. A method as set forth in claim 14, including the further step of attaching opposite ends of a tether to respective portions of each of said main panels on the sides of said main panels bordering said internal fluid cavity.

16. An air bag assembly disposed in a vehicle instrument panel which has a front presented toward an occupant compartment of a vehicle and a top presented upward toward the windshield of the vehicle and joining the front of the instrument panel, said air bag assembly comprising;
a container with an air bag stored therein in a collapsed condition, said container having an outlet located in said top of said instrument panel;
a fluid source in fluid communication with said air bag which directs fluid under pressure into said air bag;
said air bag being located in said container in an orientation such that as fluid is directed into said air bag said air bag is forced through the outlet of the container and inflated to a predetermined three dimensional configuration;

said air bag having a single internal fluid cavity at least partially formed by a pair of main panels which bow outward relative to each other as said air bag is inflated to said predetermined three dimensional configuration; and one of said main panels comprising means for causing said air bag to bend around the instrument panel and to cover a portion of the front of said vehicle instrument panel as said air bag is inflated to its predetermined configuration;

said means consisting essentially of a bend pleat formed in said one of said main panels.

17. An air bag assembly as set forth in claim 16, wherein said air bag comprises at least one expansible end pleat which interconnects respective portions of the main panels and enables the portions of the main panels to separate from each other as the bag is inflated to its predetermined three dimensional configurations.

18. An air bag assembly as set forth in claim 16, wherein said air bag has a pair of expansible end pleats extending between said main panels, one expansible end pleat disposed to be located adjacent the windshield of a vehicle and the other expansible end pleat disposed to be located in front of the front of the vehicle instrument panel when said air bag is inflated to its predetermined three dimensional configuration, said other expansible end pleat being larger than said one expansible end pleat.

19. An air bag assembly as set forth in claim 18, wherein said air bag has a fluid inlet opening in said one of said main panels and disposed at the outlet of said container, said bend pleat located between said fluid inlet opening and said other expansible end pleat.

20. An air bag assembly as set forth in claim 19, wherein said bend pleat causes the outer periphery of the air bag in the vicinity of said bend pleat to have a curved configuration when said air bag is in said predetermined three dimensional configuration.

21. An air bag assembly as set forth in claim 17, wherein said air bag has a fluid inlet opening in said one of said main panels and disposed at the outlet of said container, said bend pleat located between said fluid inlet opening and said other expansible end pleat.

22. An air bag assembly as set forth in claim 16, wherein said air bag has at least one internal tether having opposite ends connected to respective portions of said pair of main panels.

* * * * *